United States Patent
Beckley et al.

(10) Patent No.: US 7,678,171 B2
(45) Date of Patent: Mar. 16, 2010

(54) PROCESS OF PREPARING SOIL ADDITIVE OF FERTILIZER FROM FISH

(75) Inventors: Michael Beckley, Barrie (CA); Parker Robinson, Barrie (CA); William Ormsby, Orilla (CA); Michael Neale, Innisfil (CA)

(73) Assignee: HydraLogic Systems, Inc., Barrie (CA)

( * ) Notice: Subject to any disclaimer, the term of this patent is extended or adjusted under 35 U.S.C. 154(b) by 743 days.

(21) Appl. No.: 11/382,446

(22) Filed: May 9, 2006

(65) Prior Publication Data

US 2007/0261451 A1    Nov. 15, 2007

(51) Int. Cl.
*C05F 1/00* (2006.01)

(52) U.S. Cl. .............................. 71/16; 71/11
(58) Field of Classification Search ........ 71/16
See application file for complete search history.

(56) References Cited

U.S. PATENT DOCUMENTS

| | | | | |
|---|---|---|---|---|
| 2,003,887 A | * | 6/1935 | Hopkinson | 554/8 |
| 2,560,011 A | * | 7/1951 | Trudel | 426/7 |
| 2,589,287 A | * | 3/1952 | Ryan et al. | 426/657 |
| 2,589,288 A | * | 3/1952 | Ryan | 426/511 |
| 4,022,665 A | | 5/1977 | Ghosh et al. | |
| 4,043,788 A | | 8/1977 | Fryer | |
| 4,126,439 A | * | 11/1978 | Stekoll | 71/16 |
| 4,201,564 A | * | 5/1980 | Kauzal | 71/20 |
| 4,383,845 A | | 5/1983 | Rutherford | |
| 4,975,106 A | | 12/1990 | Ferguson | |
| 5,393,318 A | | 2/1995 | Iizuka et al. | |
| 7,517,514 B2 | * | 4/2009 | Jarventie | 423/317 |

* cited by examiner

*Primary Examiner*—Wayne Langel
(74) *Attorney, Agent, or Firm*—Calfee, Halter & Griswold LLP

(57) ABSTRACT

A process for preparing fertilizer from fish, and a fertilizer prepared from said process, is disclosed. The fertilizer is for use on soil and plants. The process involves hydrolysis of fish with a phosphorus containing acid, preferably an inorganic phosphorus based acid, under normal ambient conditions. Typically, phosphoric acid is used. The fertilizer prepared from the disclosed process contains 1 to 10% by weight of the phosphorus based acid.

16 Claims, 1 Drawing Sheet

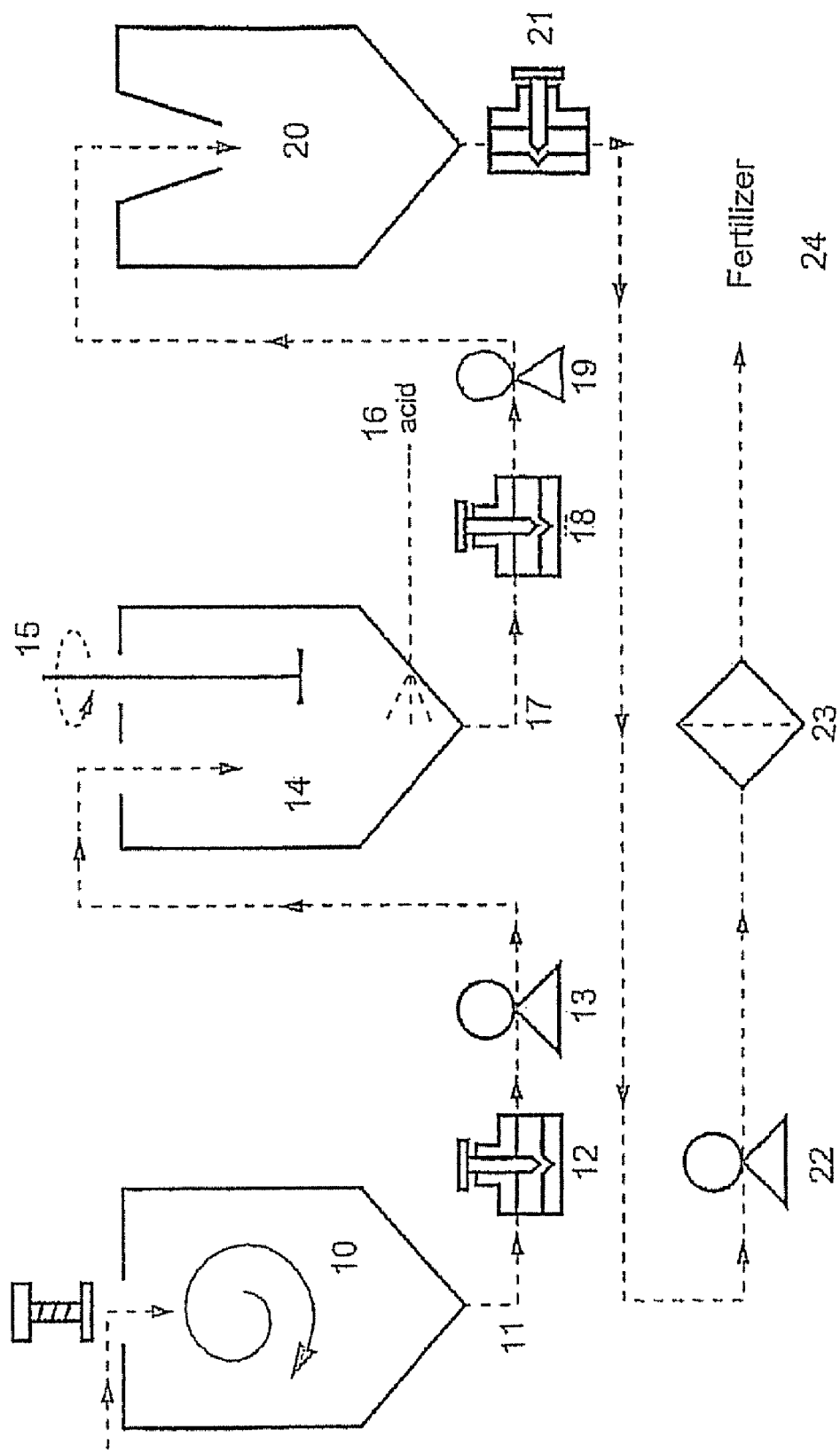
FIGURE

PROCESS OF PREPARING SOIL ADDITIVE OF FERTILIZER FROM FISH

FIELD OF THE INVENTION

The present invention relates to a process for preparing fertilizer for soil and plants, from fish.

BACKGROUND OF THE INVENTION

In the past, soil additives and plant fertilizers have been made synthetically from petroleum by-products and mineral salts. However, increasing public awareness of the environmental drawbacks of using chemical-based fertilizers has created a demand for safe, natural and more environmentally friendly fertilizers.

Waste organic materials such as waste from the food industry can be used to produce plant and soil fertilizers. Such fertilizers are relatively cheap to produce, and are also environmentally friendly, as they are made from a renewable resource, rather than non-renewable petroleum products. Another important advantage of such fertilizers over petroleum-based fertilizers is that they can improve the health of the soil, which in turn improves the health and yield of the plants. Organic fertilizers contain micronutrients and macronutrients that are not found in chemical fertilizers. The most important macronutrients are nitrogen, phosphorus and potassium. Secondary macronutrients include calcium, magnesium and sulfur. Micronutrients are elements essential for plant growth that are required in trace quantities. Important micronutrients include boron, copper, iron, chloride, manganese, molybdenum and zinc. In addition to these essential elements, "organic" fertilizers (e.g. not petroleum-based or otherwise chemical fertilizers) contain amino acids that aid plant and soil health. Organic fertilizers replenish the nutrient level of the soil and feed important soil organisms, such as nematodes, earthworms and microorganisms, which are essential for overall plant and soil health.

Chemical fertilizers do not contain the micronutrients and macronutrients found in organic fertilizers. As such, chemical fertilizers can only treat plants but not the soil. Also, chemical fertilizers may kill important soil organisms and tend to be readily leached from the soil, as they are usually composed of water soluble inorganic compounds that are easily washed away. Thus, chemical fertilizers are not retained long enough to have a significant effect on plant growth, while the chemicals leached from the soil can cause environmental damage, by pollution of nearby bodies of water.

A type of organic fertilizer is fertilizer produced from fish or fish by-products, which utilizes whole fish or fish parts left over from food processing. The use of the term "fish" throughout the application will be used to refer to whole fish, fish parts or by products of fish processing, unless stated otherwise. Fish fertilizer can be produced in two ways: (a) the formation of a fish emulsion; and (b) the hydrolysis of whole fish or fish parts to produce hydrolyzed fish fertilizer.

To produce a fish emulsion, whole fish or fish by-products are heated to extract oils and the solid material is pressed into a cake and dried to make fish meal, which can then be used for livestock feed. The liquid residue that has been pressed out of the fish cake is the fish emulsion used for fertilizer. There are two main drawbacks associated with fish emulsion fertilizer. Fish emulsion has a very strong, unpleasant odour due to the presence of decomposing proteins, caused by the high temperatures used during the fish extraction process. As fish emulsion is composed of the liquid pressed out of the fish cake, fish emulsion is primarily composed of water soluble nutrients and contains a relatively low concentration of oil-soluble nutrients. Therefore, fish emulsion is lacking in a number of macro and micro nutrients including oils, proteins and vitamins that are beneficial for optimal plant and soil health.

The second method of preparing fertilizer from fish involves the hydrolysis of whole fish or fish parts to produce hydrolyzed fish fertilizer. In this method, the starting material is ground into meal and then digested or hydrolyzed. There are numerous methods of hydrolyzing fish protein to break down solid fish into a liquid form, which fall into two categories: (1) enzymatic hydrolysis and (2) chemical digestion.

Fertilizer produced by the fish hydrolysis process has a number of advantages over fertilizer produced by the fish emulsion process. The hydrolysis process retains much more of the nutrients than the emulsion process, as the hydrolysate utilizes all of the starting material. In particular, hydrolyzed fish fertilizer retains the oil soluble nutrients which are excluded from fish emulsion. Therefore, hydrolyzed fish fertilizer provides superior results to fish emulsion fertilizer, as it contains the full spectrum of nutrients. Hydrolyzed fish fertilizer contains essential oils, vitamins, trace minerals, enzymes, and amino acids, which feed important soil organisms and are taken up more easily by the plant roots. Another advantage of the hydrolysis process is that it usually does not involve high temperatures. Consequently, the hydrolysate has very low odour as it does not contain decomposing proteins.

In some instances, consumers may wish to continue using chemical fertilizers as they are cheap and easy to apply. Organic fertilizer, including fertilizer prepared from fish, can also be used as an additive to regular chemical fertilizer. By using organic fertilizer as an additive, the chemical fertilizer is supplemented with nutrients found in organic fertilizer but not in chemical fertilizer.

In enzymatic hydrolysis, either preparations of enzymes or microorganisms are used to hydrolyze proteins into smaller peptides. The digested fish meal is then filtered to produce a whole fish hydrolysate composition. An example of enzyme hydrolysis is found in U.S. Pat. No. 5,393,318.

Enzymatic hydrolysis of fish can be carried out using preparations of enzymes such as papain, which break down proteins into smaller peptides and individual amino acids. However, enzymes are sensitive to pH and temperature, as well as the presence of inhibitors and denaturants. Enzymes will only catalyze reactions within a specific pH and temperature range. Therefore, the hydrolysis reaction must be carefully monitored and controlled. As enzymes must be isolated and refined from natural sources without destroying their catalytic activity, this further increases the manufacturing cost. Enzymatic hydrolysis of fish can also be carried out with microorganisms, e.g. anaerobic digestion as disclosed in U.S. Pat. No. 4,022,665 and U.S. Pat. No. 4,975,106.

Hydrolysis of fish protein can also be effected with chemicals. However, due to the strength of the peptide bond, stringent conditions, i.e. concentrated acid or base and heat are usually required to completely hydrolyze the fish protein. In U.S. Pat. No. 4,043,788, fish is hydrolyzed with potassium hydroxide and heating, and then neutralized with phosphoric acid. In U.S. Pat. No. 4,383,845, fish solids are digested with ammonia under 300 psi with steam. Chinese Patent 1207380 uses formic acid, sulfuric acid and propionic acid at 80-90° C. Japanese Patent No. 4037679 describes refluxing defatted fish skin in 4 to 8 N phosphoric acid. However, as noted above, the application of heat causes the decomposition of fish protein, which produces unpleasant odours. Moreover, the application of heat to fish protein generally results in a reduction in the concentration of micronutrients such as molybdenum.

A common drawback of hydrolyzed fish fertilizers is inefficient hydrolysis or uneven mechanical breakdown of the fish protein during processing, which creates a mixture of liquid and solid fish particles. This creates a fertilizer product of high viscosity that is difficult to handle, such as measuring and mixing to desirable strengths for spraying from commonly available agricultural equipment.

Accordingly, there is a need for alternative processes that overcome the above-noted drawbacks.

SUMMARY OF THE INVENTION

The present invention is directed to a process for preparing a soil or plant fertilizer or additive from whole fish, fish parts or by-products of processing fish, using a phosphorus containing acid or a salt of a phosphorus containing acid to hydrolyze fish protein. A broad aspect of the present invention involves adding water to fish parts, mechanically reducing the mean particle size of the fish parts, mixing the fish-water mixture with a phosphorus containing acid, and filtering the resultant mixture through screens to further reduce the mean particle size.

In a preferred embodiment, the present invention is carried out without the addition of heat, and with agitation during the mixing of fish meal with the phosphorus containing acid. In a further preferred embodiment, the acid is an inorganic phosphorus containing acid. In yet a further preferred embodiment, the phosphorus containing acid is phosphoric acid.

In another aspect of the present invention, the fertilizer or additive prepared by the process of the present invention contains a phosphorus containing acid. In a preferred embodiment, the fertilizer contains 1 to 10% phosphoric acid by weight.

In a further embodiment, the fish, water and acid is mixed for between 10 to 40 hours. In yet a further preferred embodiment, the fish water and acid is mixed for approximately 24 hours.

An advantage of the present invention and the fertilizer or additive prepared by the process of the present invention is that it is a simple, efficient and economical method for preparing an organic fertilizer from fish that is independent of temperature and the need for precise control of pH.

An advantage of the invention is the use of a phosphorus containing acid or salt of a phosphorus containing acid to hydrolyze the fish protein which increases the phosphorus content in the fertilizer, an important macronutrient in fertilizers and additives.

A further advantage of the invention is that it provides a process for preparing fertilizer or additive from fish, wherein the fertilizer or additive is virtually odourless, does not require the addition of preservatives to extend shelf life and is not readily leachable from the soil.

Another advantage of the present invention is that it provides a process for preparing organic fertilizer or additive from fish that contains a sufficient amount of molybdenum to enhance microbial fixation of atmospheric nitrogen in the root zone of plants.

Yet another advantage of the present invention is that it provides a process for preparing fertilizer or additive from fish that contains a soluble nitrogen to total nitrogen ratio greater than 0.5.

Yet another advantage of the present invention is that it provides a process for preparing fertilizer or additive for fish that eliminates particulate matter from the fertilizer or additive, such that the fertilizer or additive can be readily applied with commonly used agricultural equipment.

Other and further advantages and features of the invention will become apparent to those skilled in the art from the following detailed description of an embodiment thereof, taken in conjunction with the accompanying drawings.

BRIEF DESCRIPTION OF THE DRAWINGS

Various objects, features and attendant advantages of the present invention will become more fully appreciated and better understood when considered in conjunction with the accompanying drawing, which is briefly described herein.

The FIGURE is a process diagram illustrating an aspect of the invention.

DETAILED DESCRIPTION OF THE DRAWINGS

In order that the invention may be more fully understood, it will now be described, by way of example, with reference to the accompanying drawings in which the FIGURE illustrates an aspect of the present invention.

The process of the present invention utilizes an unheated acid hydrolysis under normal atmospheric pressure ("normal ambient conditions") to effect partial breakdown of fish based protein. Previous methods, disclosed in U.S. Pat. No. 4,043,788, U.S. Pat. No. 4,383,845, Chinese Patent No. 1207380 and Japanese Patent No. 4307679, use chemicals to hydrolyze fish protein. These methods typically use high concentrations of acid or base in combination with heat, sometimes under high pressure, to effect hydrolysis. However, heating causes decomposition of proteins which can produce fertilizer with undesirable odours. Also, heating, in particular high temperatures of up to 90-100° C., causes a severe decrease in the concentration of micronutrients, such as molybdenum, as compared to a fish-based fertilizer prepared with an unheated process at normal.

The process of the invention is a simple, efficient and economical way to prepare an organic based soil and plant fertilizer or additive from fish, under normal ambient conditions. As noted above, the term "fish" as used herein includes whole fish, fish parts and by-products of processed fish, which can further include waste from processing fish for food (i.e. fish meal) such as, for example, offal, bones, etc. The term "normal ambient conditions" is understood to be normal room temperature and normal atmospheric pressure. Fertilizer prepared by the present invention is generally odourless, is not readily leached from the soil and can be easily applied using commonly available agricultural equipment. Moreover, as the process of the invention occurs under normal ambient conditions, the concentration of important micronutrients including molybdenum in the fertilizer prepared by the process of the invention is much higher than in a fertilizer prepared by a heated process. In the fertilizer prepared by the process of the invention, there is a sufficient amount of molybdenum to enhance microbial fixation of atmospheric nitrogen in the root zone of plants.

In a broad aspect of the invention, the process comprises the following steps:
(a) Adding water to fish (whole fish or fish parts including offal, bones and the head);
(b) Mixing the fish-water mixture to mechanically reduce mean particle size of the fish parts;
(c) Acidification of the fish-water mixture with a phosphorus containing acid or a salt of a phosphorus containing acid to an acidic pH, such as, for example, pH 0.5 to 6.5, and preferably pH 1.0 to 4.0, to the fish and water mixture to hydrolyze the fish, the hydrolysis reaction being carried out for about 10 to 40 hours under normal ambient conditions, with mixing by bubbling air through the mixture;

(d) Filtration of the hydrolyzed fish and water mixture, preferably through screens of pre-determined mesh size, the filtrate being the fertilizer.

In a preferred embodiment of the invention, hydrolysis of the fish protein is carried out in 24 hours.

The water used for preparing the fish fertilizer is preferably potable water.

A phosphorus containing acid or salt of a phosphorus containing acid is used to acidify the fish-water mixture in order to hydrolyze the fish protein. The pH of the fish-water mixture is adjusted to be acidic, preferably pH 0.5 to 6.5, more preferably pH 1.0 to 4.0 and still more preferably pH 2.0 to 3.0. The phosphorus based acid is preferably an inorganic acid.

In a preferred embodiment, an inorganic phosphorus containing acid or salt thereof is added to the fish-water mixture. Such inorganic phosphorus acids include the following: phosphoric acid ($H_3PO_4$), phosphorous acid ($H_3PO_3$), phosphinic acid ($H_3PO_2$), and meta-phosphoric acid (($HPO_3)_n$, n>2), a polymeric compound of variable molecular weight; salts of phosphorus containing acids with at least one acidic hydrogen, including salts of mono- and di-hydrogen phosphate ($HPO_4^{-2}$, $H_2PO_4^{-1}$) and stable salts of phosphorous and phosphinic acid ($HPO_3^{-2}$, $H_2PO_2^{-2}$). Suitable inorganic salts include alkali salts of mono- and di-hydrogen phosphate, such as sodium ($Na^+$) and potassium ($K^+$), and ammonium salts ($NH_4^+$). Stable inorganic salts of phosphorous acid and phosphonic acid include sodium phosphite ($Na_2HPO_3$) and sodium hypophosphite ($NaH_2PO_2$). Hydrated forms of the above noted salts can also be used. In a further preferred embodiment of the invention, phosphoric acid, $H_3PO_4$ is used to acidify the fish-water mixture and hydrolyze the fish. Technical grade phosphoric acid can be used, which is typically available as a ~75-85% w/w solution in water, from manufacturers such as Sigma-Aldrich Co. (St. Louis, Mo.). The phosphorus containing acid or salt of phosphorus acid remains in the fish mixture and forms a part of the fertilizer, thereby contributing to the overall phosphorus content of the fertilizer. As noted above, phosphorus is an important micronutrient for maintaining plant and soil health.

As shown in the FIGURE, fish is fed to a blending tank 10, and a volume of water equal to half the quantity of fish by weight is added and blended with a high speed shearing mixer to mechanically reduce the particle size of the fish. The fish and water mixture from blending tank 10 is fed by pipe 11 through the valve 12 and pump 13, to a hydrolysis tank 14 which is fitted with an air-sparging/bubbling assembly 15. Alternative blending systems that would be well-known in the art may also be used if desired. The solids content of the mixture is checked using a rapid moisture test method such as an infra-red lamp powered system, e.g. Denver Instrument™ IR-200 Infra-Red Moisture Analyzer. Water is added to adjust the solids content to 25% w/V to ensure batch production uniformity. A prescribed amount of phosphorus containing acid 16 is added to the fish-water blend to acidify the mixture preferably pH 0.5 to 6.5, more preferably pH 1.0 to 4.0 and still more preferably pH 2.0 to 3.0. Typically, phosphoric acid, obtained as a ~75% w/w solution in water is added to a total of about 2-6% w/v of the fish-water mixture to arrive at the desired pH as noted above.

Air is delivered with the air-sparging/bubbling assembly 15 for between approximately 10 to 40 hours to the base of the hydrolysis tank 14, at a rate to maintain gentle agitation of the fish-water mixture. In a preferred aspect, the mixture is agitated for about 24 hours.

After mixing, the hydrolyzed fish-water mixture is further processed by transferring the mixture from hydrolysis tank 14 via pipe 17 and a second valve 18 and pump 19 to the initial screening processing tank 20. Screened product is fed via a third valve 21 and pump 22 to a filtration system 23. Preferably, the filtrate is passed through screens to remove particulate matter of a given size. For example, a standard mesh sieve #100 will remove all particulate matter of a diameter greater than 150 µm. By filtering the filtrate to remove particulate matter, the resultant solution is generally homogeneous with a generally uniform viscosity, so as to be easily applied using commonly used agricultural equipment. The filtrate from the filtration system 23 is the solution 24 which is then stored and ready for use.

Embodiments of the present invention can be used as an additive to reduce the amount of chemical fertilizer that is applied. Embodiment of the present invention can also be used as an additive to supplement the nutrients found in chemical fertilizers, by providing nutrients not found in chemical fertilizers.

Further details of the preferred embodiments of the preferred embodiments of the invention are illustrated in the following examples which are understood to be non-limiting with respect to the appended claims.

Example 1

Equal weights of fish parts derived from fish processing waste, comprising offal, fish frames, and heads, and potable water were mixed together. A high speed shearing mixer was applied to the fish-water mixture to reduce mean particle size. Phosphoric acid was added in an amount equivalent to about 5% of the weight of the fish-water mixture. The resultant mixture was then gently agitated by bubbling air through the mixture with an air sparging/bubbling assembly, for about 24 hours and until the soluble nitrogen to total nitrogen ratio was greater than 0.5. The mixture was then filtered through at least one mesh screen to remove particulate matter. Preferably, a series of screens is used to filter the mixture, such as U.S. standard mesh sieve #16 (1.18 mm) followed by U.S. standard mesh sieve #100 (150 µm), such that only particles of diameter less than 150 µm remain in the filtrate.

An analysis of the fertilizer thus produced is provided below in Table 1.

TABLE 1

| | Units | Concentration |
|---|---|---|
| % Solids Content, m/V | | 21.2 |
| Nitrogen | % | 0.95 |
| Phosphorus $P_2O_5$ | % | 1.16 |
| Potassium $K_2O$ | % | 0.10 |
| Calcium | % | 0.10 |
| Sodium | % | 0.04 |
| Magnesium | % | 0.01 |
| Zinc | ppm | 13.00 |
| Manganese | ppm | 1.00 |
| Copper | ppm | 2.12 |
| Iron | ppm | 12.44 |
| Sulfur | % | 0.14 |
| Cobalt | ppm | 0.20 |
| Nickel | ppm | 17.90 |
| Boron | ppm | 0.57 |
| Molybdenum | ppm | 5.75 |

Example 2

Fish based fertilizer prepared according to Example 1 was subjected to a scientific trial and compared with a synthetic fertilizer and an untreated control as follows:

Three turf-grass species, "Crest" Kentucky bluegrass (*Poa pratensis*), "Cutter" perennial ryegrass (*Lolium perenne*) and "Penncross" creeping bentgrass (*Agrostis palustris*) were treated according to Table 2(a):

TABLE 2(a)

| | Total number of samples | | |
|---|---|---|---|
| Turf-grass species | No treatment | Reference fertilizer | Fertilizer of Example 1 |
| "Crest" Kentucky bluegrass (*Poa pratensis*) | 8 | 8 | 8 |
| "Cutter" perennial ryegrass (*Lolium perenne*) | 8 | 8 | 8 |
| "Penncross" creeping bentgrass (*Agrostis palustris*) | 8 | 8 | 8 |

The reference fertilizer was prepared as a stock solution of 10.68 g $KH_2PO_4$, 39.92 g $NH_4H_2PO_4$ and 17.32 g $NH_4NO_3$ in 1000 mL, of water, then diluted before use to obtain a nitrogen-phosphorus-potassium ("NPK") ratio of 1-2.8-0.34, in order to be comparable to the embodiment of the present invention. The reference fertilizer was applied at a standard greens maintenance rate, annualized at 3 kg actual nitrogen/ 100 $m^2$.

A standard root zone mixture was used for 8 replications of each treatment in 10×10 cm pots. Typical seeding rates were used and placed in a randomized block design, kept moist until germinated and thereafter irrigated to prevent stress, using 100 mL/week of appropriate fertilizer solution or water as a control. Leaf and root growth were analyzed at the end of 70 days and data statistically analyzed (SAS Statistical Systems). The resultant leaf and root growth are summarized in Table 2(b).

TABLE 2(b)

| Average Mass* | Control | Reference | Fertilizer of Example 1 |
|---|---|---|---|
| Total dry mass (g) | 1.41 | 2.20 | 2.97 |
| Root dry mass (g) | 1.00 | 0.80 | 2.30 |
| Root:Shoot ratio | 2.63 | 0.58 | 3.05 |

*Average mass of the 8 treated samples.

The fish fertilizer in accordance with the embodiments of the invention provide increase plant mass over the inorganic fertilizer and the control. The mass increase is primarily in the root system, which is to be expected of turf grass species.

Numerous modifications, variations, and adaptations may be made to the particular embodiments of the invention described above without departing from the scope of the invention, which is defined in the following claims.

We claim:

1. A process for preparing a fertilizer from fish comprising the following steps performed under normal ambient conditions:
   (a) blending fish with water to form a mixture of fish and water;
   (b) mechanically treating the mixture of step (a) to reduce the mean particle size in the fish-water mixture of step (a);
   (c) hydrolyzing the fish-water mixture of step (b) under acidic conditions by addition of a phosphorus containing acid, a stable salt of a phosphorus containing acid or a hydrate thereof, and mixing under ambient conditions; and
   (d) filtering the mixture of step (c) and collecting the filtrate as the fertilizer.

2. The process of claim 1 wherein the fish is whole fish, fish parts or by-products of processed fish.

3. The process of claim 1 wherein the mixture of step (c) is acidified to pH 0.5 to 6.5.

4. The process of claim 1 wherein the mixture of step (c) is acidified to pH 1.0 to 4.0.

5. The process of claim 1 wherein the pH of the mixture of step (c) is adjusted to pH 2.0 to 3.0.

6. The process of claim 1 wherein the mixture of step (c) is mixed at a temperature of less than 50° C.

7. The process of claim 1 wherein the mixture of step (c) is mixed for between 10 and 40 hours.

8. The process of claim 1 wherein the filtration of step (d) removes particulate matter greater than 150 μm.

9. The process of claim 1 wherein the phosphorus containing acid is an inorganic acid or a salt of an inorganic phosphorus containing acid or a hydrate thereof, wherein said salt or its hydrate contains at least one acidic hydrogen.

10. The process of claim 9 wherein the inorganic phosphorus containing acid is selected from the group consisting of phosphoric acid ($H_3PO_4$), phosphorous acid ($H_3PO_3$), phosphinic acid ($H_3PO_2$), meta-phosphoric acid (($HPO_3$)$_n$, n>2), inorganic salts of monohydrogen phosphate ($HPO_4^{-2}$) and dihydrogen phosphate ($H_2PO_4^{-1}$), and stable inorganic salts of phosphorous ($HPO_3^{-2}$) and phosphinic acid ($H_2PO_2^{-2}$).

11. The process of claim 9 wherein said inorganic salt of a phosphorus based acid or a hydrate thereof is an alkali or ammonium salt.

12. The process of claim 9 wherein the acid is phosphoric acid.

13. The process of claim 12 wherein final concentration of phosphoric acid in the filtrate of step (d) is 1 to 10% w/v.

14. The process of claim 12 wherein final concentration of phosphoric acid in the filtrate of step (d) is 2 to 6% w/v.

15. The process of claim 7 wherein the mixture of step (c) is mixed with an air-sparging assembly.

16. The process of claim 1 wherein a high speed shearing mixer mechanically treats the mixture of step (a) to reduce the mean particle size in the fish-water mixture of step (a).

* * * * *